United States Patent [19]

Hopper et al.

[11] Patent Number: 5,402,469

[45] Date of Patent: Mar. 28, 1995

[54] CARRIER LOCATING SYSTEM

[75] Inventors: Andrew Hopper, Little Shelford; Roy Want, Cambridge; Roger M. Needham, Coton; David J. Wheeler, Cambridge, all of Great Britain

[73] Assignee: Olivetti Research Limited, Cambridge, Great Britain

[21] Appl. No.: 973,264

[22] Filed: Nov. 9, 1992

Related U.S. Application Data

[63] Continuation-in-part of Ser. No. 590,012, Sep. 28, 1990, abandoned.

[51] Int. Cl.[6] .......................................... H04M 11/00
[52] U.S. Cl. ..................................... 379/93; 379/201; 379/211; 340/825.54
[58] Field of Search ............... 379/201, 210, 211, 196, 379/93-96; 358/825.44, 825.54, 825.55

[56] References Cited

U.S. PATENT DOCUMENTS

| | | | |
|---|---|---|---|
| 4,275,385 | 6/1981 | White | 379/211 |
| 4,495,496 | 1/1985 | Miller, III . | |
| 4,601,064 | 7/1986 | Shipley | 379/211 |
| 4,649,385 | 3/1987 | Aires et al. | 379/210 |
| 4,752,951 | 6/1988 | Konneker | 379/57 |
| 4,837,568 | 6/1989 | Snaper | 340/825.54 |
| 4,952,928 | 8/1990 | Carroll et al. | 340/825.54 |
| 4,990,892 | 2/1991 | Guest et al. . | |

Primary Examiner—Wing F. Chan
Attorney, Agent, or Firm—Lee, Mann, Smith, McWilliams, Sweeney & Ohlson

[57] ABSTRACT

A system for locating any mobile body or a plurality thereof within a predetermined environment, wherein each mobile body carries a transmitter (10 to 18), each transmitter producing a unique identifying signal, and a plurality of receivers (20 to 32) located in a corresponding plurality of defined regions in the environment, each receiver incorporating a FIFO buffer memory (28) into which carrier identifying data is inserted and a controller for interrogating the receiver means in turn to link the identification data with location data.

15 Claims, 2 Drawing Sheets

CARRIER LOCATING SYSTEM

RELATED APPLICATION

This application is a continuation-in-part of U.S. patent application Ser. No. 590, 012, filed Sep. 28, 1990, and now abandoned.

FIELD OF THE INVENTION

This invention concerns a system for locating the whereabouts of mobile carriers (which may be vehicles or people or animals or any movable items) within a predetermined environment.

BACKGROUND OF THE INVENTION

Paging systems are known whereby a centrally located operator can call up a person by name over a tannoy system.

Radio paging systems are also known whereby in a similar manner, but with greater secrecy, each one of a group of people carrying individual radio receivers can be called up using a radio transmitter to transmit an appropriate call up signal to cause the appropriate one of the radio receivers to emit a signal (either audible or visual or both) to thereby alert the carrier to make contact with the central operator.

Both systems rely on a telephone system within the environment within which the called up people are located to enable the paged person to make contact with the central operator.

Neither system however enables the operator to determine in advance whether any particular carrier is actually within the environment and where, in the environment, the carrier is actually located at any particular time. In each case the operator only becomes aware of whether the carrier is within the environment let alone where the carrier is located, after the carrier has made contact with the operator by establishing a telephone link using a locally situated telephone receiver.

U.S. Pat. No. 4,601,064 to Shipley describes a communication system for locating or tracking persons or objects to automatically establish two-way conversation with the person located via an associated intercom or telephone system. The locating system requires each person or object to be located, to carry an infra-red pulse transmitter which operates continuously automatically and repetitively and generates a unique pulse train so that each carrier can be identified by decoding its pulse train. In different regions are located infra-red receiver units which are set to continuously receive transmitter pulse signals. Each receiver includes a memory capable of storing the identifying data (derived from a received pulse transmitter) of one carrier, and to avoid confusion the identifying data stored in the receiver is erased either as a result of the receiver being polled or by the reception of a new pulse train, whether from the same or a different transmitter.

Such a system is economically as regards memory capacity for each receiver but clearly data can be lost if the polling rate is not high enough.

In order to permit a high polling rate Shipley proposes a 20 wire multiple cable to enable a parallel data bus system to be used which enables a very high polling rate, so that each receiver should be interrogated at least as frequently as randomly transmitted pulse transmissions will be received from carriers in the region.

In order to reduce the need for such high polling rates, Shipley proposes that if lower polling rates are used, certain identifying pulse train data signals may be lost due to being replaced by a later transmitted pulse train from another transmitter. On a statistical basis, if one of the identifying data signals is not seen during the end of one interval by a first polling, statistically it may be resident in the receiver memory during a subsequent polling and Shipley therefore proposes to accumulate values over a number of polls in order to identify a number of transmitters in a given region, but only after a number of pollings have occurred. This would certainly enable a number of different transmitter units within one region to be separately seen by the receiver unit associate therewith and recorded by the central processor but not as a result of a single polling, only after a number of pollings have occurred.

In the experience of the inventors of the present invention, however, systems such as Shipley are high in cost in view of the vast amount of copper cable which is required and such systems are also unreliable due to the large number of interconnections and the possibility of high resistance or open circuit connections occurring and the resulting loss of data. In addition, the electrical capacitance of such cabling is such that if the length of multiway cable is excessive, the bandwidth limitation can easily render the system incapable of operating at the polling rates required by the Shipley system so that essentially such a system can only be considered for a relatively small building.

The invention of the present application has no such problems, and obviates the inherent design disadvantages incorporated in the Shipley system, that is, the need for a parallel data bus, high polling rates and multiple polling.

It is therefore an object of the present invention to provide a system which does not require a parallel data bus nor high polling rates nor multiple pollings by which a central controller (which may be a person or programmed computer), can rapidly determine whether a particular carrier is located within a given environment and if so where the carrier is located within the environment, to thereby enable the controller to make contact with the carrier by using a standard internal telephone system to cause a telephone near to where the carrier is locate to ring, and route an incoming telephone call directly to a telephone convenient to where the carrier is actually located at the time the call is received.

SUMMARY OF THE INVENTION

According to one aspect of the invention a system for locating the whereabouts in a predetermined environment of each of a plurality of carriers, comprises:

a) Transmitter means on the carriers for transmitting identifying signals, each transmitter producing a unique signal;

A plurality of receiver means located in each of a corresponding plurality of separate defined regions making up the predetermined environment and each adapted to receive any of the unique identifying signals should any of the transmitting means be within range, each receiver means including a FIFO buffer memory to which carrier identifying data is inserted whenever a transmission from a carrier is received, and c) A controller adapted to interrogate each of the plurality of receiver means in turn to record the identifying data (obtained from the FIFO buffer memories as they are addressed), with regional data, thereby linking the carrier identifying data with positional identifying data relating to the environment.

Preferably the transmitter means transmit identifying signals for short durations of time which are well spaced by larger intervals of time, and preferably a degree of randomness is introduced into the spacing period so as to reduce the risk of simultaneous transmissions.

In a system in which incoming telephone calls which contain a unique extension code are to be routed automatically by a programmed computer which is to use the extension code to identify the carrier to whom the call is to be routed, the computer operates so as to determine the current positional data linked to the carrier data associated with the extension code and thereby enable the region (and therefore a convenient telephone extension) to be identified, whereby the incoming call can be routed to that telephone extension.

In a system in which incoming telephone calls are intercepted by a human operator, display means may be provided such as a screen or mimic diagram or the like and input means is available to the operator to enter data which identifies the carrier to whom the call is to be routed, and a programmed computer operates in response to such input to display on the screen (or otherwise), information which may enable the operator to ascertain the region in which that carrier was last located or, may advise the operator of the appropriate telephone extension number to which to route the calls.

Conveniently the transmitter means includes an infra-red source and driver therefor and the receiver means includes an infra-red sensitive transducer (such as an infra-red sensitive diode) and signal amplifier.

Preferably each transmitter means includes a PPM encoding device which drives a infra-red emitting diode, and switch means, and a pulse generator and timing circuit means are provided for determining the intervals during which the diode is to transmit coded information.

By arranging that each of a plurality of transmitters to be used by carriers within a given environment each transmits a uniquely coded signal for only a very short period of time which itself is relatively randomly determined, so each receiving means will in general only received a single carrier transmission at any instant in time and each carrier can be uniquely identified and its position determined as aforesaid.

If it is essential that two transmissions from carrier mounted transmitter units never occur simultaneously, a form of time division and synchronisation must be built into each carrier mounted transmitter to prevent any such occurrance. Thus in one form of such a transmitter, a crystal controlled timing device is incorporated which is set to produce trigger signals for releasing coded carrier data from the transmitter on a repetitive synchronous basis, which can be pre-set within a series of time slots so that each transmitter unit only transmits coded carrier data during one of said time slots within each repetitive period of time.

Alternatively receiver means may be incorporated within each transmitter means and a synchronous timing signal may be transmitted throughout the whole environment by transmitter means associating with each said receiver located within each region within the environment, so that all of the receivers are locked into synchronous operation and each receiver is pre-programmed to transmit coded data relating to the carrier in a strictly defined period of time following each synchronous signal, each of the periods of time being different for the different transmitters to thereby again eliminate the possibility of duplication of transmission within any given region.

The components making up each transmitting means may be miniaturised and packaged together with a miniature battery onto a badge or device which can be worn or carried externally by a person or mounted on a vehicle or other item or animal which is to be monitored.

Such receiver means conveniently comprises a PPM decoder for generating digital data for storing in the FIFO memory and a controller and an address ROM into which address data is entered on installation, uniquely indicating in coded format the location of that receiving means relative to the overall environment.

Data in the FIFO memory of a receiving means may be read out by transmitting an address corresponding to that in the address ROM of the receiving means concerned, so causing the receiver controlled to interrogate the associate FIFO memory and to transmit the decoded carrier data stored therein, together with coded data indicating the identity (and therefore the location) of the receiving means.

A FIFO buffer memory is required in practice, to prevent data being lost if a number of carrier transmitter devices should transmit data in quick succession, an so that the interrogating loop can be interrupted for short periods without data loss.

The interrogation loop may be a 4-wire OR'd network operating at 4800 Baud.

The invention will now be described by way of example with reference to the accompanying drawings.

DETAILED DESCRIPTION OF THE DRAWINGS

Figure 1:
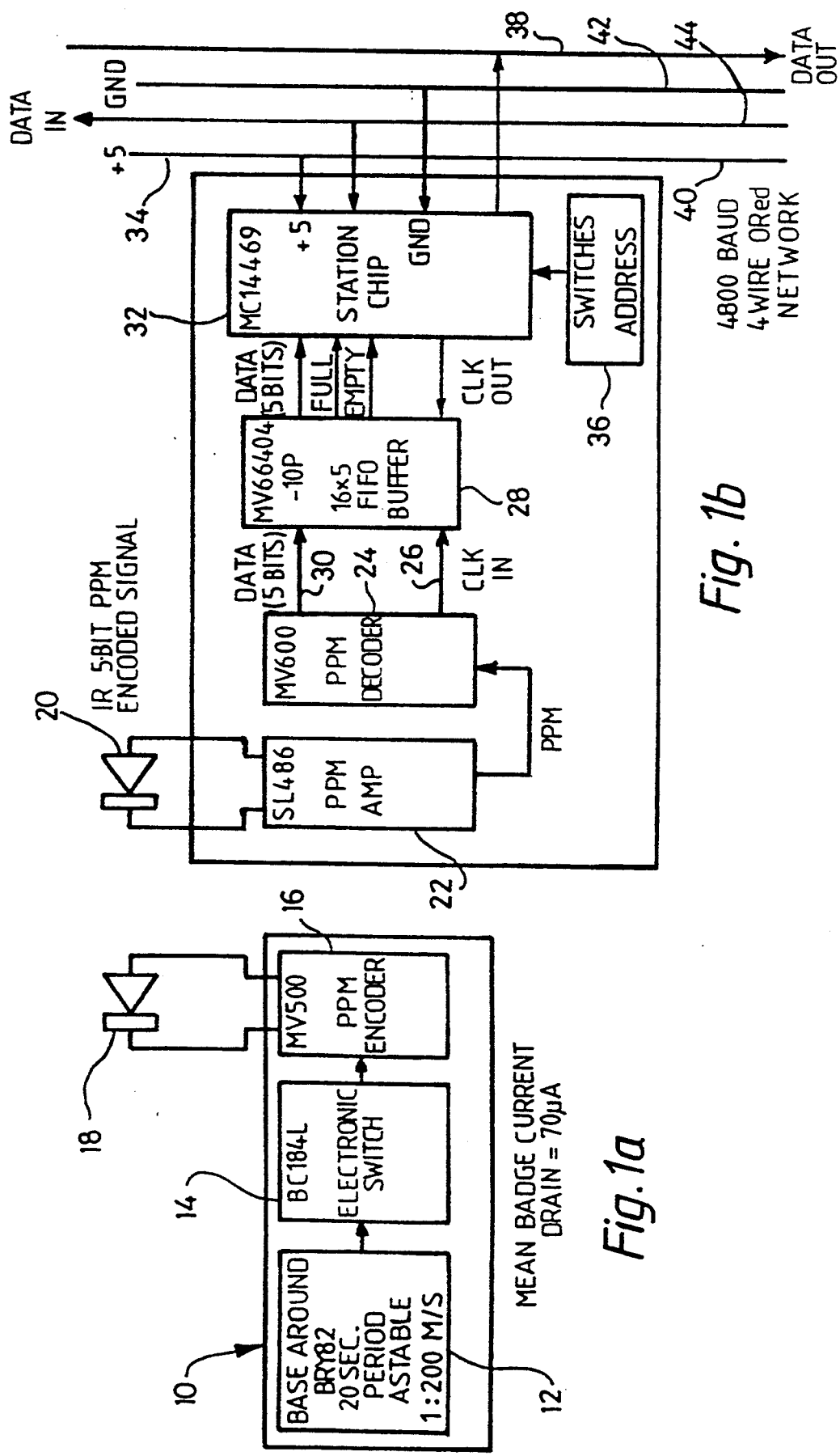
FIGS. 1a and 1b together show a block schematic diagram of a mobile carrier position locating system embodying one aspect of the present invention.
Figure 2:
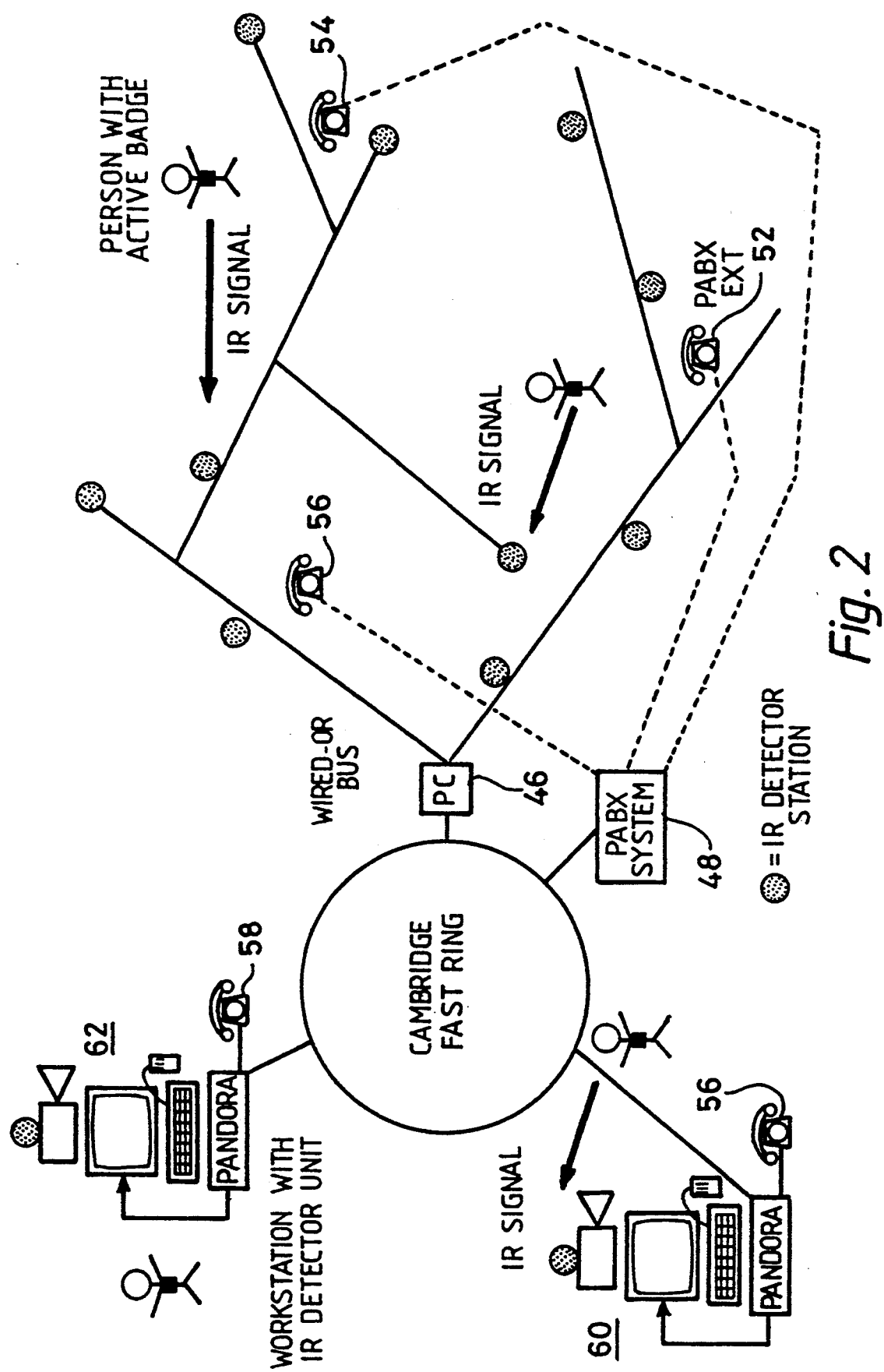
FIG. 2 is a schematic diagram showing how a plurality of receivers may be connected to a central processor and via a data network inter alia to a PABX and other work stations in a work environment.

In FIGS. 1a, 1b the essential parts of a mobile "badge" transmitter are shown in FIG. 1a and likewise the essential parts of one of the zone receivers are shown in FIG. 1b, such as are employed in a badge position locating system incorporating the invention. In the overall system a receiver such as shown in FIG. 1b is located in each zone to be interrogated and is hard wired via a multi-path highway to a central processor for interconnecting telephones in a PABX system, such as shown in FIG. 2.

As shown in FIG. 1a each transmitter 10 comprises a battery power supply (not shown) for powering a 20-second period astable multi-vibrator 12 for producing pulses having 1:200 mark to space ratio.

The multi-vibrator is based around a BRY62 device and provides control pulses for operating an electrical switch 14 based on a BC 184L device. Switch controls are device type MV500 arranged as a PPM encoder 16 for driving an infra-red transmitting element 18 such as an infra-red emitting diode.

Each receiver unit comprises an infra-red detector 20 which feeds the input to a PPM high gain signal amplifier 22 based on a device type SL486, the PPM output of which is supplied to a PPM decoder 24 based on the device type MV600. the Latter provides a clock pulse signal along a path 26 to a 16×5 FIFO buffer store 28 based on device type MV6640410P, to which 5-bit data is supplied to the data input of the device via path 30.

FIFO buffer store 28 is also triggered by clock pulses from a central processor device 32, such as device type MC14489, and delivers the 5-bit data words to the data input terminal of the processor device 32. The processor also receives control signals denoting when the FIFO is FULL or EMPTY.

The processor 32 is powered from a 5 volt line 34 and is connected to the negative side of a supply such as a mains powered power supply unit (not shown).

A station address is set up by pre-set switches 36 and the processor 32 is programmed to transfer the data stored in the FIFO buffer 28 to a data bus 38 (forming part of a four-wire highway). The latter comprises a 5 volt line 40, a ground line 42 and a second data line 44.

Referring again to FIG. 2, the central processor is shown as a personal computer 46 programmed to deliver a sequence of station addresses along the data line 44. When a detector station processor 32 receives a station address signal corresponding to the address as set up by its associated switches 36, the data in its associated FIFO memory is transmitted via the processor 32 to data line 38 and thence to the central processor of computer 46.

The rate at which different station addresses are transmitted by the computer 46 is selected such that there is at least sufficient time for a completely filled FIFO memory to be read out between one receiver address and the next. Thus where the FIFO memory device is a 16×5 bit device the time between receivers addresses must be at least equal to the time for 80 bits of data to be transmitted from the receiver to the computer 46 together with the addressing data and any handshake protocols at the beginning and ending of each data transmission from a receiver to the computer.

The central processor PC46 is programmed to link the zone address signals with the badge identifying signals from each FIFO MEMORY, within a memory associated with the computer 46, so that badge signals are associated with particular zone identification signals and the PC can be interrogated in a conventional manner to indicate the zone within which any particular bade, or group of badges, is currently located.

In the general case, if up to N different carriers can be located in any one region of the overall environment at any one time, and each unique carrier identifier signal is made up of n bits of data, then the FIFO memory of each receiver must be capable of storing N×n bits of data. Likewise the controlling PC 46 must be capable of linking up to N different carrier identifiers with one regional identification data signal and the polling rate must not be greater than one receiver per T seconds, where T is the time in seconds for transmission of (N×n) bits of data plus the time required to address the receiver and receive location identifying data.

As shown in FIG. 2 the central processor PC46 can be arranged to set up ringing and speech paths via a PABX 48 to any one of a number of telephone extensions 50, 52, 54, 56 and 58. A ring bus such as Cambridge Fast Ring may be employed to link work stations such as 60 and 62 to the central processor 46 and the same ring may be employed to transmit signals to and from the telephone extensions 56 and 58, as well as data to and from the work stations 60 and 62, and the computer PC46–and if appropriate, via the PABX, to external telephone lines using modems.

In use the system allows incoming external calls for a particular person, routed via the PABX 48, to transmit a ringing signal to the telephone extension in the zone within which the identified person is located. This is achieved by allocating a unique identification number to each person to whom calls are to be so directed, and to issue to that person a badge having as its "call sign" the same number. An incoming call including that number (corresponding effectively to a telephone extension number) is decoded by the PC46, and the memory within the PC46 consulted for the same number. When found, the zone identification for that badge number is noted and a ringing tone is transmitted to a telephone extension within the identified zone. (Where there is only one telephone in each zone, the routing is relatively straightforward and can be completed (or not) depending on whether the telephone extension is busy or free. Where more than one telephone is located in each zone (as will normally be the case) the routing will be slightly more complicated but can be arranged using some form of hierachy, or simply random selection, of available extensions).

Alvervatively the routing of the incoming call may be by a telephone operator who can interrogate the PC46 using the badge number of the required person, to call up the zone within which they can be found, before selecting the telephone extension to be rung, to enable the incoming call to be connected to a telephone in close proximity to the called person.

We claim:

1. A system for locating the whereabouts in a predetermined environment of each of a plurality of carriers, comprising:

a) transmitter means on the carriers for transmitting identifying signals, each transmitter means producing a unique signal which therefore identifies the carrier;

b) a plurality of receiver means respectively located in a corresponding plurality of separate defined regions making up the predetermined environment and each adapted to receive any of the unique identifying signals when any of the transmitting means are within range, each receiver means including a solid state FIFO buffer memory capable of sequentially storing carrier identifying data of a plurality of different carriers, and into which carrier identifying data is inserted whenever a transmission from a carrier is received; and c) a controller adapted to interrogate each of the plurality of receiver means in turn, to address the FIFO buffer memory in each receiver and obtain and record the carrier identifying data therein in association with data defining the region within which the receiver is located, thereby linking the carrier identifying data with positional identifying data relating to the environment.

2. A system as claimed in claim 1, wherein each transmitter means transmits identifying signals for particular durations of time which are spaced by intervals of time, which are greater in duration than said particular duration.

3. A system as claimed in claim 2, wherein, within limits, randomness is introduced into the spacing intervals of time so as to reduce the risk of simultaneous transmissions.

4. A system as claimed in of claim 1, applied to a telephone system in which incoming telephone calls which contain a unique extension code are routed automatically by a programmed computer which uses the extension code to identify the carrier to whom a call is to be routed, wherein the computer also operates so as to determine the current positional data linked to the carrier data associated with the extension code and thereby enable the identification region, and therefore the identification of a convenient telephone extension, whereby the incoming call is routed to that telephone extension.

5. A system as claimed in claim 1, applied to a telephone system in which incoming telephone calls are intercepted by a human operator, including display means, operator input means for enabling the operator to enter data which identifies the carrier to whom a call is to be routed, and a programmed computer which operates in response to such input to display information which either enables the operator to ascertain the region in which that carrier was last located or advises the operator of the appropriate telephone extension number to which to route the call.

6. A system as claimed in claim 1, wherein each transmitter means includes an infra-red source and driver therefor and each receiver means includes an infra-red sensitive transducer and signal amplifier.

7. A system as claimed in claim 6, wherein each transmitter means includes a PPM encoding device which drives an infra-red emitting diode and switch means, and a pulse generator and timing circuit means are provided for determining the intervals during which the diode is to transmit coded information.

8. A system as claimed in claim 1, wherein, in each transmitter means, a crystal controlled timing device is incorporated which is set to produce trigger signals for releasing coded carrier data from the transmitter on a repetitive synchronous basis, which timing device can be pre-set within a series of time slots so that each transmitter means only transmits coded carrier data during a unique one of said time slots within each repetitive period of time.

9. A system as claimed in claim 1, wherein a control receiver is incorporated within each transmitter means and a synchronous timing signal is transmitted throughout the whole environment, so that all of the control receivers are locked into synchronous operation, and each control receiver is pre-programmed to cause its associated transmitter means to transmit coded data relating to the carrier in a strictly defined period of time following each synchronous signal, the periods of time being different for the different transmitter means.

10. A system according to claim 1, wherein the components making up each transmitting means are miniaturised and packaged together with a miniature battery into a device which can be worn or otherwise carried externally by a person or vehicle or other item or animal which is to be monitored.

11. A system as claimed in claim 1, wherein each receiver means comprises a PPM decoder for generating digital data for storing in the FIFO memory and a controller and an address ROM into which address data is entered on installation, uniquely indicating in coded format the location of that receiving means relative to the overall environment.

12. A system as claimed in claim 11, wherein data in the FIFO memory of a receiving means is read out by transmitting an address corresponding to that in the address ROM of the receiving means concerned, so causing the receiver means controlled to interrogate the associated FIFO memory and to transmit the decoded carrier data stored therein, together with coded data indicating the identity, and therefore the location, of the receiving means.

13. A system as claimed in claim 12, wherein an interrogation loop associated with each FIFO memory is a 4-wire OR'd network operating at 4800 Baud.

14. A system as claimed in claim 1, in which the FIFO buffer is formed to store up to N (N greater than 1) carrier identifiers each of n bits, whereby each receiver is thereby able to receive and retain carrier identifiers of up to N carriers, and in which said controller is adapted to obtain and record up to N items of carrier identifying data therein in association with data unique to a region.

15. A system as claimed in claim 14, in which the controller transmits a new receiver address after a period of time at least equal to that required to transmit at least (n×n) bits of data from the FIFO memory in the receiver to the controller and receiver identifying data.

* * * * *